United States Patent [19]

Pommer, II

[11] 4,406,927
[45] Sep. 27, 1983

[54] ELECTRONIC TONE RINGER

[75] Inventor: Karl E. Pommer, II, Corinth, Miss.

[73] Assignee: International Telephone and Telegraph Corporation, New York, N.Y.

[21] Appl. No.: 261,929

[22] Filed: May 8, 1981

[51] Int. Cl.³ .............................................. H04M 1/00
[52] U.S. Cl. ................................................. 179/84 T
[58] Field of Search ................. 179/84 T, 84 R, 81 R; 307/356

[56] References Cited

U.S. PATENT DOCUMENTS

| | | | |
|---|---|---|---|
| 3,772,470 | 11/1973 | Cowpland et al. | 179/84 T |
| 3,867,585 | 2/1975 | Morstadt | 179/84 T |
| 4,081,617 | 3/1978 | Clark | 179/84 T |
| 4,140,884 | 2/1979 | Ouimet et al. | 179/84 T |
| 4,189,626 | 2/1980 | Malerba et al. | 179/84 T |
| 4,214,131 | 7/1980 | Bush et al. | 179/84 T |
| 4,346,265 | 8/1982 | Buss et al. | 179/84 T |

Primary Examiner—G. Z. Rubinson
Assistant Examiner—James L. Dwyer
Attorney, Agent, or Firm—John T. O'Halloran

[57] ABSTRACT

An electronic tone ringer for use in a telephone instrument to respond to ringing currents to generate an output tone electronically is described. A controlled breakdown rectifier bridge is placed across the input line to produce a d.c. output in response to ring input. The d.c. output is fed to an oscillator to produce a signal which is fed to a piezo-electric transducer to produce output tones. A number of safeguards are built into the circuit to prevent random noises from being fed to the oscillator. Further, the controlled breakdown bridge provides voltage clamp action to prevent spikes of voltage from damaging the circuit.

7 Claims, 9 Drawing Figures

SUPPLY CURRENT (NO LOAD) VS. SUPPLY VOLTAGE

ELECTRONIC TONE RINGER

BACKGROUND OF THE INVENTION

This invention relates to a ringer circuit for a telephone instrument. Electronic tone ringers for use in telephone instruments are well-known, dating from such U.S. Pat. Nos. as 3,772,470 issued Nov. 13, 1973 and 3,867,585 issued Feb. 18, 1975. In such patents, it is conventional to provide a rectifier bridge across the line to which ring signals are fed. It is also conventional to provide threshold circuits, voltage clamp circuits and transient suppression in the circuit between the bridge and the oscillator. In the previously noted references, the oscillator output was forwarded to a transducer such as a speaker. In other known circuits such as U.S. Pat. No. 4,214,131 issued July 22, 1980 and 4,140,884 issued Feb. 20, 1979, audio output is produced by a piezo-electric transducer.

In various prior art electronic ringer arrangements which are powered from ringing signals received over the telephone line, the incoming ringing signals are coupled to a full wave bridge rectifier which converts the a.c. ringing voltage to d.c. Various arrangements are utilized to ensure that the output voltage of the bridge rectifier is limited so that the remaining portion of the ringer is protected from high voltages. One approach is to connect a zener diode across the output terminals of the bridge rectifier. This approach, however, results in added component count.

Additionally, certain prior art ringer arrangements include a zener diode in series with the output of the bridge rectifier so that low level AC signals such as voice signals, DTMF signaling, etc. will not turn the ringer on. A disadvantage of these arrangements is that the serial connection of the zener diode reduces the power available to drive the ringer circuit when ringing signals are present.

Further, under the EIA STANDARDS PROPOSAL, PN-1286, Phase 1, Telephone Instruments for Voiceband Applications with Loop Signaling, Sixth Draft, Sept. 1979 prepared by the EIA Engineering Committee TR-41 a non-linear impedance "signature" is required of the ringer circuits for loop maintenance testing. The "signature" required is that the input impedance at 2.5 VRMS at 24 Hz must be more than four times the impedance at 10 VRMS. It is believed that none of the prior art electronic ringers provide such a signature.

A further problem with certain prior art electronic ringers is that during dialing of digits, so called "bell tapping" tone bursts are produced.

SUMMARY OF THE INVENTION

An electronic ringer circuit in accordance with one aspect of the invention includes a controlled breakdown voltage full wave bridge rectifier circuit to simultaneously provide both rectification of ac ringing signals and over voltage protection for the ringer circuit. The controlled breakdown voltage bridge rectifier of an illustrative embodiment of the invention includes a first diode connected between a first input terminal and a first output terminal, a second diode connected between a second input terminal and the first output terminal, a first zener diode connected between the first input terminal and a second output terminal and a second zener diode connected between the second input terminal and the second output terminal.

Further, in accordance with the principles of the invention, a resistance and a filter capacitor are serially coupled across the telephone line. A voltage controlled electronic switch is included which is responsive to the voltage across the filter capacitor such that when the voltage is less than a first predetermined level, the switch is in a first conductive state and couples a non-linear resistance in shunt across the capacitor and in series with the resistance such that a voltage divider is formed with the capacitor connected to the output of the divider. When the voltage across the capacitor exceeds the first predetermined level, the electronic switch assumes a second conductive condition to couple power from the telephone line to a tone source. The electronic switch includes hysteresis such that a second predetermined voltage level which is less than the first predetermined level is required to return the switch to the first conductive condition. In accordance with the principles of the invention, the non-linear resistance includes a serially connected resistor and a voltage breakdown device such as a zener diode.

Further in accordance with the principles of the invention, an electronic ringer includes a bell tap suppression circuit which detects dial pulsing by sensing the current flow through the filter capacitor and when the current level exceeds a predetermined value the bell tap suppression circuit decreases the sensitivity of the ringer circuit. In an illustrative embodiment of the invention, a current detector energizes an electronic switch when the current through the filter capacitor exceeds a predetermined level. The electronic switch in turn connects a resistor in shunt with a portion of a voltage divider network, the output voltage of which determines when the tone generator circuit operates.

Further, in accordance with the principles of the invention, an electronic ringer circuit has a non-linear input impedance such that the input impedance at a first voltage is a multiple of the input impedance at a second voltage. In the illustrative embodiment of the invention, a controlled breakdown voltage device, e.g., a zener diode is inserted in the aforementioned voltage divider at low input voltage e.g. 2.5 VRMS, the controlled breakdown voltage device does not conduct current with the result that the bridge rectifier diodes are not forward biased and the circuit exhibits a high input impedance. At a higher input voltage, e.g., 10 VRMS, the controlled breakdown voltage device becomes conductive and the input impedance is reduced.

BRIEF DESCRIPTION OF THE DRAWINGS

The invention may be better understood from a reading of the following detailed description in conjunction with the drawings in which like reference designations refer to like parts and in which.

DETAILED DESCRIPTION

Figure 1:
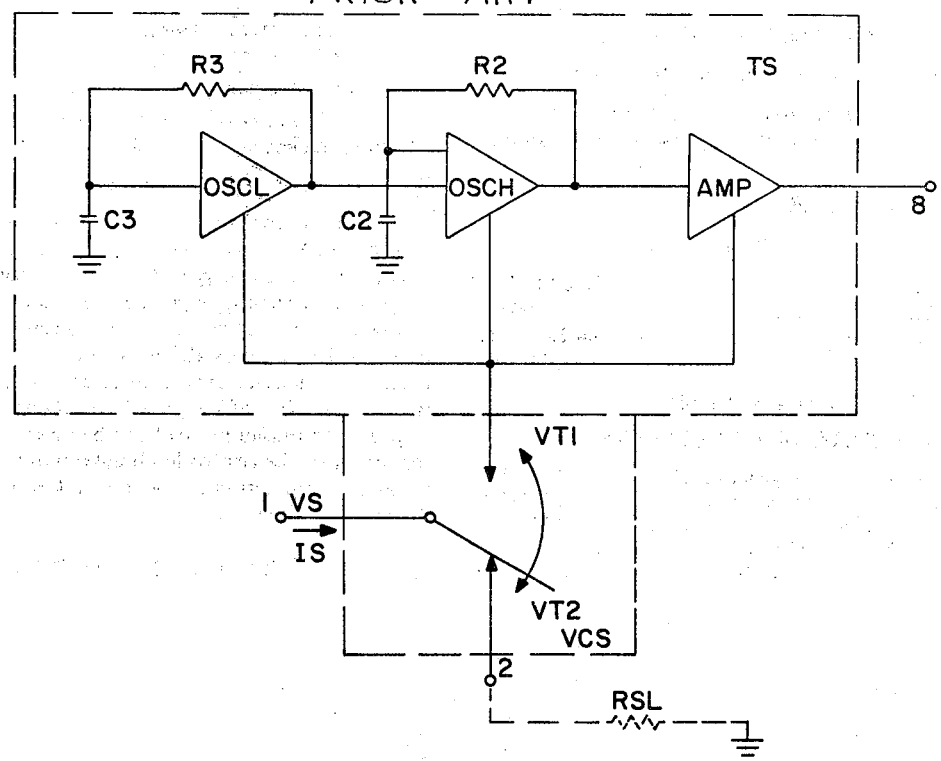
FIG. 1 illustrates a prior art tone generator and control circuit which may advantageously be employed in the invention.

FIG. 1 illustrates a prior art tone generator circuit 1 to which the present invention may advantageously be applied. The tone generator includes an electronic switch VCS and a tone source TS which contains two audio frequency oscillators and an amplifier. The oscillator OSCH operates at the nominal frequencies of 1700 and 2100 Hz. The frequencies of the oscillators OSCH and OSCL are determined by the R-C networks R3, C3 and R2, C2 respectively. Oscillator OSCL shifts the frequency of oscillator OSCH between the nominal frequencies of 1700 and 2100 Hz at a 10 Hz rate. The output amplifier AMP amplifies the audio frequency signal before it is applied to output terminal 8.

The oscillators OSCL and OSCH and the amplifier AMP are powered by current ringing voltage which has been rectified and smoothed. The ringing voltage VS is applied to terminal 1 which is connected to a voltage controlled switch VCS. The switch VCS operates such that power is not supplied to the oscillators OSCL, OSCH and amplifier AMP until the voltage at terminal 1 has increased to a threshold value which is predetermined. When this threshold level is exceeded the switch VCS provides voltage to the oscillators OSCL, OSCH and amplifier AMP. The switch VCS includes hysteresis such that the ringing voltage required to turn the circuits on is greater than the ringing voltage required to turn the circuits off. When the voltage VS is less than a first predetermined threshold level VT1 the ringing current IS is coupled to a load resistance RSL connected to terminal 2. When the voltage VS exceeds threshold voltage VT1, switch VCS couples the ringing current IS to the tone source TS. The switch VCS includes hysteresis in switching such that ringing current will then be supplied to the tone source TS until voltage VS drops to a threshold voltage level VT2 which is less than VT1 at which point ringing current is again directed to load resistance RSL.

In other words, when the ringing voltage VS reaches a first predetermined level VT1 the switch VCS turns tone source TS on and when the ringing voltage subsequently drops to a second lower predetermined level VT2 switch VCS turns tone source TS off.

Typically the ringing voltage VS applied to the input of the tone generator circuit 1 is derived from the ringing voltage on the tip and ring pair of a telephone line through a voltage divider arrangement used to charge a filter capacitor. As part of this typical arrangement a fixed value resistance RSL is connected to terminal 2 as part of the divider arrangement. The value of resistor RSL is used to program the slope of the ringing current IS vs ringing voltage VS characteristic, and hence the ringing current IS up to the voltage level VT1 at which the tone source is turned on.

Figure 2:
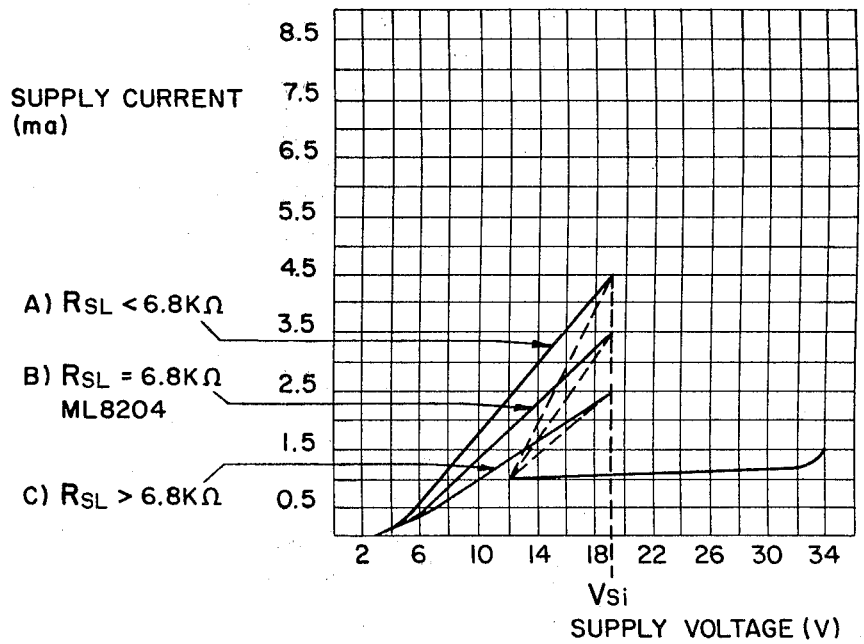
FIG. 2 illustrates the effect of varying impedances on the operation of the voltage controlled switch of FIG. 1.

The voltage levels VT1 and VT2 remain constant independent of the value of RSL. The supply current IS prior to triggering of the switch VCS varies inversely with RSL, decreasing for increasing value of resistance. Thus, increasing the value of RSL will decrease the level of AC ringing voltage and the resulting current IS required to trigger the switch VCS. FIG. 2 illustrates the variation of ringing current IS with ringing voltage VS for three values of RSL.

Circuits such as those of FIG. 1 are presently utilized in the 76E Electronic Push-Button Telephone subset marketed under the international trade name Digitel 2000 from Kirk Telephone Factories of Denmark and also as a commercially available integrated circuit designated ML 8205 from Mitel of Canada.

Figure 3:
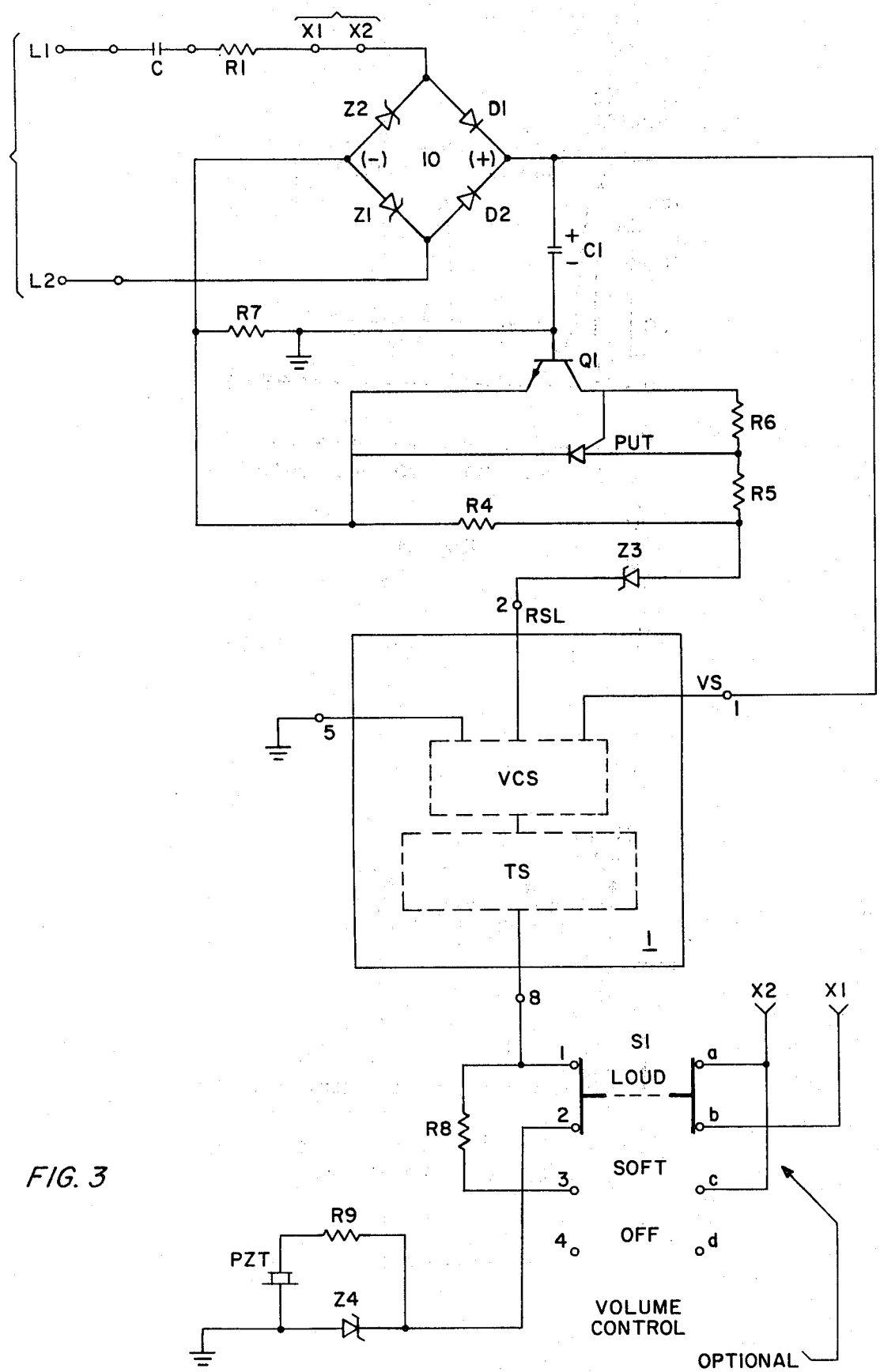
FIG. 3 illustrates an electronic ringer circuit in accordance with the principles of the invention.
Figure 4A:
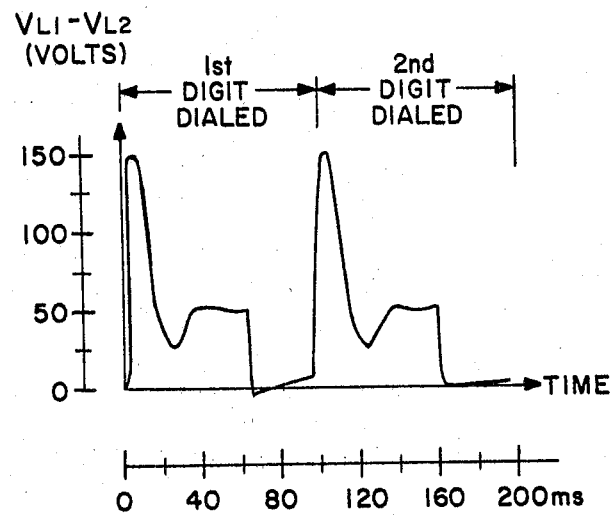
FIGS. 4A–C are waveforms for bell tap signals.
Figure 4B:
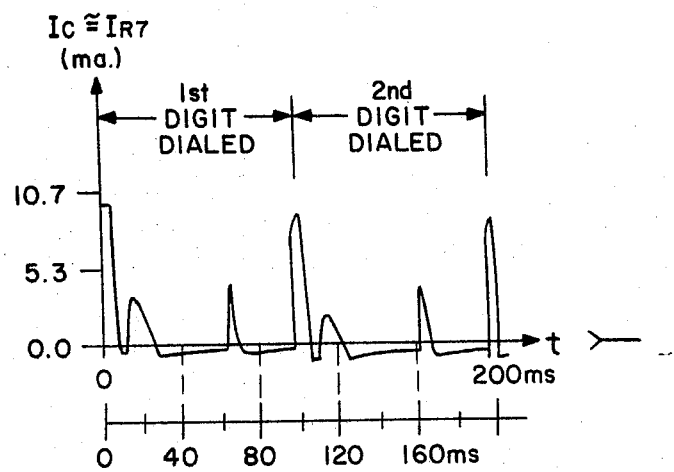
Figure 4C:
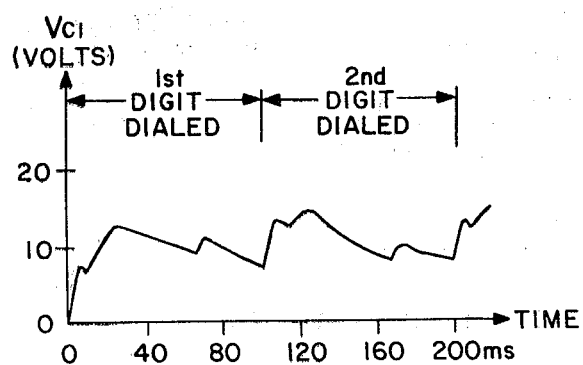

Turning now to FIG. 3, an electronic telephone ringer in accordance with the principles of the invention is shown. Terminals L1 and L2 are connectable to a switching network line such as the tip and ring leads of a telephone line. Ringing voltages of between 40 Vrms and 150 Vrms (A.C.) with frequencies in the range of 15.4 Hz and 68 Hz to superimposed D.C. voltages of up to ±105 V. DC. are applied across L1 and L2. As is conventional, a bypass capacitor C is used to separate the AC signal from the DC component. The AC signal is then applied to a controlled breakdown bridge rectifier 10 through a voltage dropping resistor R1. The controlled breakdown bridge rectifier 10 includes 28 volt zener diodes Z1, Z2 and diodes D1, D2. The bridge rectifier 10 provides a controlled breakdown characteristic which in conjunction with voltage dropping resistor R1 limits the power dissipated in the TONE GEN. circuit TS in the presence of high level AC input ringing voltages. The "+" output terminal of the bridge 10 is coupled to filter capacitor C1 and to the VS input at terminal 1 of switch VCS. A resistor R7 is coupled between filter capacitor C1 and the "−" terminal of the bridge 10. It has been observed that bell tap signals tend to have high dV/dt rates which result in high charge currents through C1. Additionally the input voltages are non-symmetric and tend to be of one polarity. FIG. 4A illustrates typical short loop bell tap signals using the bell tap generator of the aforementioned EIA reference. FIG. 4B in turn illustrates the current flow through capacitor C1 and resistor R7 and FIG. 4C in turn illustrates the voltage across capacitor C1.

Figure 5A:
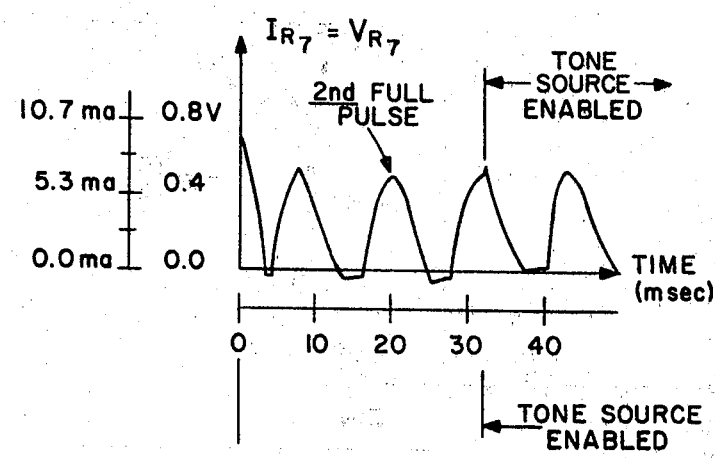
FIGS. 5A and 5B are waveforms for ringing signals.
Figure 5B:
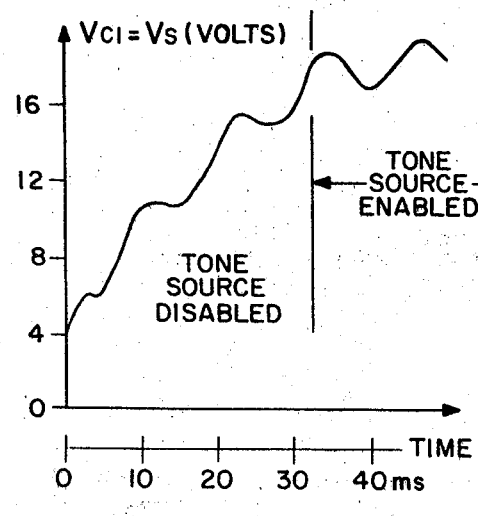

For a typical low-level ringing signal waveform of 53.6 VAC at 42.5 Hz, the current through capacitor C1 and R7 is shown in FIG. 5A. The corresponding voltage across capacitor C1 is shown in FIG. 5B. Initially the peak current through resistor R7 is approximately 9 ma. but subsequently drops to less than 7.6 ma. for all succeeding AC cycles. The voltage across capacitor C1 during the time that the current is greater than 7.6 ma. is less than approximately 5.2 volts.

For bell tap signals, the current through capacitor C1 rises to a current level greater than 7.6 ma. and the voltage across the capacitor C1 quickly rises such that a voltage level of greater than approximately 9 volts is reached while the current is above 7.6 ma. Thus, 7.6 ma. may be chosen as a "critical current" which distinguishes bell tap signals from low level ringing signals.

Resistor R7 and transistor Q1, which has its base terminal connected at the node between filter capacitor C1 and resistor R7, acts as a current monitor or comparator. When the charge current through capacitor C1 and resistor R7 exceeds a critical value, which is approximately 7.6 ma for R7 having a value of 75 ohms, collector current flows in transistor Q1. When collector current flows in Q1, a programmable unijunction transistor PUT which has its gate or control terminal connected to the collector of Q1, is biased into the "on" state through resistor R6 as long as the capacitor C1 is charged to a voltage sufficient conduct current through zener diode Z3. Transistor PUT remains in the "on" state after the charge current pulse through capacitor C1 disappears until the current through the transistor PUT drops below the valley current of the transistor PUT. With transistor PUT in the "on" state, resistor R5 is connected in parallel with resistor R4. Resistor R4 is connected between ground and the RSL input at terminal 2 of SWITCH VCS through a zener diode Z3. With resistor R5 connected in parallel with resistor R4, the sensitivity of switch VCS is reduced for a given input signal. The critical value of the charge current through resistor R7 which is required for the transistor PUT is to be switched on is determined from the observed difference in the current wave forms between "BELL TAP" signals due to pulse or rotary dialing, and low-level ringing signals as explained above.

When transistor Q1 is off and transistor PUT is off, resistor R5 is in effect left floating and only resistor R4 determines the input sensitivity of the switch VCS. Thus, it is evident that the circuit formed by resistors R4, R5 and the transistor PUT forms a non-linear resistance which in one state has a resistance approximately equal to the parallel combination of resistors R4, and R5 and in a second state has a resistance equal to R4.

The audio output signal of the tone source TS at terminal 8 is connected to a transducer via a volume control switch S1 which comprises a three position slide switch. Switch S1 in the position shown directly connects terminal 8 to a transducer circuit 20. In an intermediate position, i.e. SOFT, switch S1 serially connects resistor R8 with transducer circuit 20. In a third position, i.e. off, the transducer is disconnected and the ringer may be disconnected from the telephone line.

The transducer circuit 20 comprises a piezo-electric transducer PZT of known type in series with resistor R9. A protection diode Z4 is connected in shunt with resistor R9 and transducer PZT.

Switch S1 may also carry a second bridging contact and terminals a,b,c,d which may replace the shorting link 30 connected between terminals X1, X2.

The electronic ringer of FIG. 3 has three distinct modes of operation. At low level input signal voltages across terminal L1, L2 which are typical of speech, dual tone multifrequency signaling or low level loop maintenance test signals, the electronic ringer exhibits a very high impedance which effectively removes the electronic ringer from the telephone line. For intermediate level signals across terminals L1, L2, the electronic ringer exhibits a lower impedance value for maximum sensitivity to ringing signals. For high level signals across terminals L1, L2, e.g. as a result of high level ringing signals, or lightning surge, or bell-tapping pulses due to dialing, the electronic ringer presents an even lower impedance. This lower impedance occurs as a result of transistor PUT switching resistor R5 in shunt with resistor R4 thereby increasing the load across filter capacitor C1. This arrangement allows the electronic ringer to differentiate between dialing pulses and ringing signals while improving transient response time and alerting sensitivity.

By utilizing typical short and long loop bell tap signals obtained using the circuits of FIGS. 18 and 19, page 70 of EIA Standards Proposal, PN-1286, Phase 1, Telephone Instruments for Voice Band Applications with Loop Signaling, Sixth Draft, Sept. 1979, prepared by EIA Engineering Committee TR-41, it has been determined that typical charge current waveforms contained peak currents in excess of 7.6 ma. due to the rapid changes in the input voltage waveform. Under these conditions, the transistor PUT is turned on by transistor Q1. The electronic ringer is thereby made insensitive to dial pulse waveforms since the voltage at terminal 1 is kept below the turn on voltage, VT1, of the switch VCS.

Figure 6:
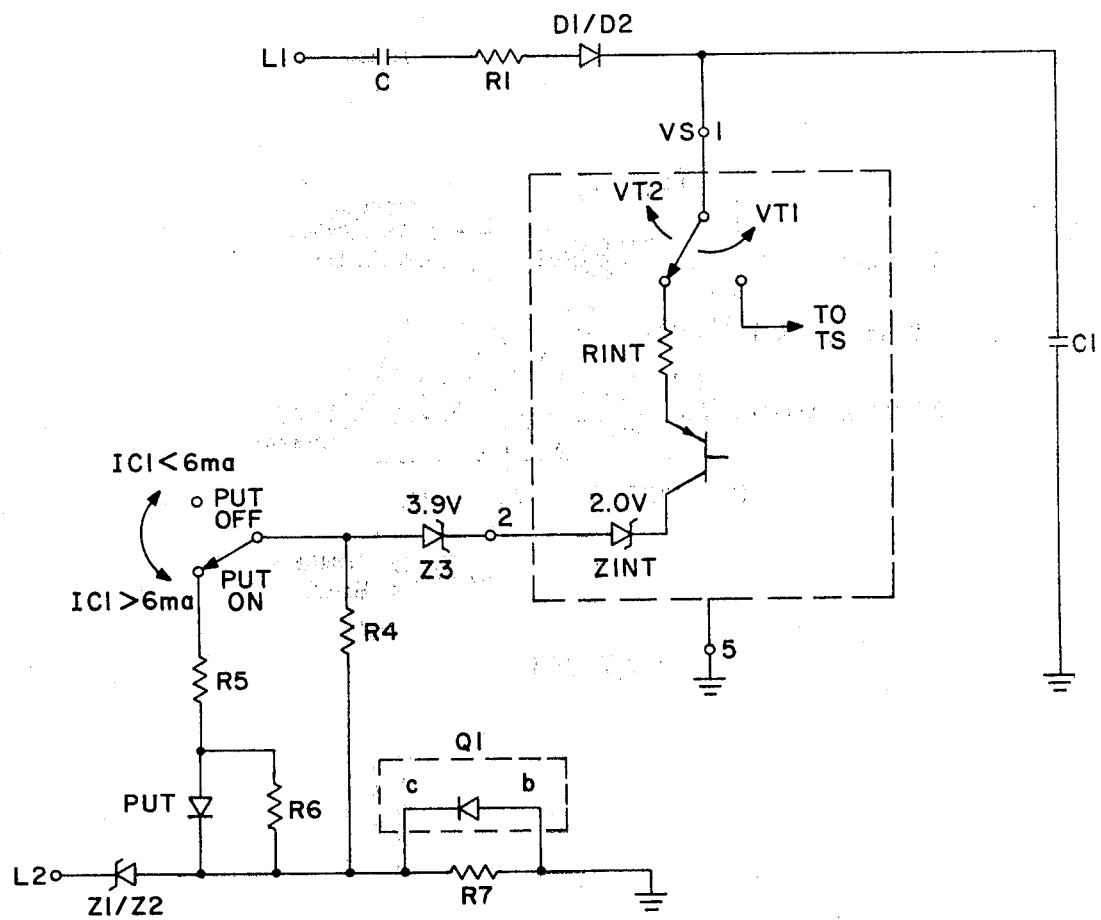
FIG. 6 illustrates portions of the circuit of FIG. 3 with equivalent circuits.

FIG. 6 illustrates the input portions of the circuit of FIG. 3 with the transistor PUT represented as a switch and a diode, the equivalent circuit of transistor Q1 is represented as a diode and a partial equivalent circuit of switch VCS. When the electronic ringer is subjected to randomly switched bursts of ringing voltage, the initial current pulse through filter capacitor C1 and registor R7 may have a value greater than the aforementioned critical value of 7.6 ma, i.e., the current level required for transistor Q1 to turn on transistor PUT and decrease the alerting sensitivity to ringing voltage. The voltage characteristics of zener diode Z3 and the equivalent input circuit of switch VCS, which may be represented by an internal zener diode ZINT, a transistor collector to emitter junction QINT and a resistor RINT, prevent the initial current pulse from switching the transistor PUT into its "on" state. However, transistor PUT will be switched into the "on" state if the current pulses exceed the critical value during the time between the initial current flow and the time that VS exceeds the some critical level, approximately 9 volts, required to conduct PUT valley current through Z3 and ZINT. At lower input voltages and higher ring frequencies, the "off" to "on" transition of transistor PUT may either delay or prevent the voltage VS from turning on the tone source. If it is delayed, the duration of the output tone of the ring generator will be somewhat variable. However, this technique provides a high degree of bell tap suppression without degradation of turn-on time or voltage sensitivity to short ringing bursts.

The transistor PUT is normally off for AC voltages across terminals L1, L2 that are less than approximately 11 volts. When the AC voltage across terminals L1, L2 is less than approximately 3 volts the equivalent impedance between terminals L1 and L2 is greater than 100K ohms since zener diodes Z3 and ZINT are not conductive and filter capacitor C1 will be charged to a peak dc voltage level such that the diodes in bridge 10 are prevented from conducting. At voltages greater than 3 volts AC the zener diodes Z3 and ZINT will become increasingly more conductive thereby providing a discharge circuit in shunt with capacitor C1. The discharge circuit will comprise the serial connection of switch VCS, doide Z3 and resistor R4. At 10 V.A.C. an equivalent impedance of less than 50K ohms will be presented to terminals L1, L2. This non-linear impedance meets the impedance "signature" requirement outlined in the aforementioned EIA standards proposal for loop maintenance testing, i.e., the input impedance at 2.5 VRMS and 24 Hz is more than four times the input impedance of 10 VRMS.

The following components are used in the above-described illustrative embodiment:

| | | |
|---|---|---|
| C | = | 0.47 microf. |
| C1 | = | 6.8 microf. |
| C2 | = | .068 microf. |
| C3 | = | .0033 microf. |
| R1 | = | 5.6k ohms |
| R2 | = | 1 m ohms |
| R3 | = | 118k ohms |
| R4 | = | 9.1k ohms |
| R5 | = | 6.8k ohms |
| R6 | = | 2.7k ohms |
| R7 | = | 75 ohms |
| R8 | = | 22 K ohms |

-continued

| | | |
|---|---|---|
| R9 | = | 2.2K ohms |
| D1, D2 | = | 1N4148 |
| Z1, Z2, Z4 | = | 1N5255B (28 volt) |
| Z3 | = | 1N4622 (3.9 volt) |
| PUT | = | 2N6027 |
| PZT | = | MURATA 7BB-41-2AO |
| Q1 | = | National 5484A |

With the above component values, various measurements have been made: Table 1 shows the measured input impedance of the ringer circuit for various voltages at a frequency of 15.6 Hz.

TABLE 1

| Input Voltage (volts) | Input Impedance (ohms) |
|---|---|
| 10 | 44,000 |
| 20 | 31,000 |
| 40 | 29,000 |

It is noted that part 68 of the relevant F.C.C. regulations require that the input impedance be between 40,000 ohms at an input voltage of 40 volts.

The above component values also easily provide the maintenance "signature" as mentioned hereinabove. Table 2 shows various measured input impedances for various input voltages at 24 Hz.

TABLE 2

| Input Voltage (volts) | Input Impedance (ohms) |
|---|---|
| 2.5 | 10 m |
| 3.0 | 3 m |
| 5.0 | 111k |
| 10.0 | 34k |
| 20.0 | 23k |
| 30.0 | 21k |

At a DTMF frequency of 1633 Hz a 3 volt input signal results in an input impedance of 1.22 m. The input impedance becomes higher for higher DTMF frequencies.

For an input of 10 v at 5 Hz the circuit exhibits an input impedance of greater than 90 k.

For 150 volt input the circuit has an input impedance of 8.7 k which is a ringer equivalence of 0.9 B.

It will be evident to those skilled in the art that various modifications may be made to the illustrative embodiment without departing from the spirit and scope of the invention. For example, the transistor PUT may be replaced with various Silicon Unilateral Switch devices or transistor equivalent circuits.

What is claimed is:

1. An electronic circuit for generating audio output signals in response to input ringing signals on a telephone line, and in which said circuit includes an oscillation circuit responsive only to voltages above a predetermined threshold applied to its input terminal for generating oscillations, wherein the predetermined threshold voltage level is determined by the voltage applied to a threshold input of the oscillation ciruit wherein the improvement comprises rectifier bridge means for blocking direct current from said electronic circuit and for transmitting voltages in response to alternating current signals on the telephone line, an input path from said rectifier bridge to said threshold input terminal, resistance means in said input path for setting the threshold voltage applied to the threshold input terminal, switching means responsive to voltages with higher currents than are normally present in ringing voltages to operate and switch the input path to raise the setting of the threshold applied to the input terminal of said oscillating circuit, and in which there is a transducer responsive to the generated oscillations of said oscillation circuit for generating said audio output signal.

2. An electronic circuit as claimed in claim 1, in which said switching means includes a programmable unijunction transistor.

3. An electronic circuit as claimed in claim 1, in which said transducer comprises a piezo electric transducer.

4. An electronic circuit as claimed in claim 1, in which there is second resistance means responsive to operation of said switching means to be switched into a parallel circuit with said first mentioned resistance means for raising the threshold applied to the threshold input of the oscillating circuit.

5. An electronic circuit as claimed in claim 2, in which there are bias means for retaining said transistor operated after a reduction of current below the initial operating level of said transistor.

6. An electronic ringing circuit responsive to the imposition of ringing current across a telephone line for activating oscillating means to produce an audio output, said circuit including a bridge rectifier across said telephone line for rectifying imposed ringing current to supply voltage of at least a threshold level to said oscillating means for generating said audio output, the improvement wherein there is a first circuit path from said bridge rectifier to a threshold level input of said oscillating means for causing activation of said oscillating means when ringing current is imposed on said telephone line, switching means, resistance-capacitance means in said first circuit path responsive to a voltage elevated above the level of voltage of said ringing current for operating said switching means to place a second circuit path in parallel with a portion of said first circuit path for elevating the threshold level of said threshold level input of said oscillating means, in which said switching means comprises a first and a second transistor both switched to their conductive states on operation thereof, and in which one of said transistors comprises a unijunction transistor.

7. An electronic ringing circuit as claimed in claim 6, in which said rectifier bridge comprises a pair of controlled breakdown diode elements therewithin.

* * * * *